United States Patent
Lin

(10) Patent No.: US 10,243,774 B2
(45) Date of Patent: Mar. 26, 2019

(54) METHOD FOR TRANSMITTING A MULTI-CARRIER SIGNAL, A RECEIVING METHOD, DEVICES, AND ASSOCIATED COMPUTER PROGRAMS

(71) Applicants: B<>COM, Cesson Sevigne (FR); Orange, Paris (FR)

(72) Inventor: Hao Lin, Cesson Sevigne (FR)

(73) Assignee: B<>COM, Cesson-Sevigne (FR)

( * ) Notice: Subject to any disclaimer, the term of this patent is extended or adjusted under 35 U.S.C. 154(b) by 110 days.

(21) Appl. No.: 15/516,253

(22) PCT Filed: Sep. 29, 2015

(86) PCT No.: PCT/FR2015/052582
§ 371 (c)(1),
(2) Date: Mar. 31, 2017

(87) PCT Pub. No.: WO2016/051062
PCT Pub. Date: Apr. 7, 2016

(65) Prior Publication Data
US 2017/0310525 A1    Oct. 26, 2017

(30) Foreign Application Priority Data
Oct. 3, 2014   (FR) .................................. 14 59532

(51) Int. Cl.
*H04L 27/26*    (2006.01)
*H04L 5/00*     (2006.01)
*H04L 25/02*    (2006.01)

(52) U.S. Cl.
CPC ........ *H04L 27/2698* (2013.01); *H04L 5/0051* (2013.01); *H04L 25/0226* (2013.01); *H04L 27/2613* (2013.01)

(58) Field of Classification Search
None
See application file for complete search history.

(56) References Cited

U.S. PATENT DOCUMENTS

2009/0257518 A1* 10/2009 Lele .................... H04L 25/0228
                                                             375/260
2009/0316569 A1* 12/2009 Lele .................... H04L 25/0228
                                                             370/206

(Continued)

OTHER PUBLICATIONS

International Search Report dated Dec. 18, 2015 for corresponding International Application No. PCT/FR2015/052582, filed Sep. 29, 2015.

(Continued)

*Primary Examiner* — Otis L Thompson, Jr.
(74) *Attorney, Agent, or Firm* — David D. Brush; Westman, Champlin & Koehler, P.A.

(57) ABSTRACT

A method for transmitting a multi-carrier signal implementing an OQAM-type modulation, formed of a temporal succession of symbols including data elements modulating a carrier frequency of the signal. A carrier frequency modulated by one of the data elements is called a carrier, wherein a set of carriers is allocated to a transmitter unit. The method includes inserting a sequence of pilots specific to the transmitter unit at a given time into the multi-carrier signal on the allocated set of carriers. The sequence of pilots includes: a sequence of non-zero complex values, inserted on odd or even carriers, alternating with zero values, inserted on the other carriers, respectively even or odd-numbered; non-zero complex values of the sequence of pilots, their frequency transforms and inverse frequency transforms being with a constant envelope; and and a sequence of zero values modulating the carriers of the set of carriers allocated at the following time.

13 Claims, 10 Drawing Sheets

(56) References Cited

U.S. PATENT DOCUMENTS

| | | | | |
|---|---|---|---|---|
| 2010/0238978 | A1* | 9/2010 | Lele | H04J 13/10 |
| | | | | 375/146 |
| 2011/0110458 | A1* | 5/2011 | Siohan | H04L 27/2602 |
| | | | | 375/295 |
| 2012/0093176 | A1* | 4/2012 | Siohan | H04L 5/0007 |
| | | | | 370/497 |
| 2015/0049836 | A1* | 2/2015 | Li | H04L 5/0048 |
| | | | | 375/295 |
| 2015/0092885 | A1* | 4/2015 | Li | H04L 27/264 |
| | | | | 375/296 |
| 2016/0099822 | A1* | 4/2016 | Thein | H04L 5/0051 |
| | | | | 375/260 |
| 2017/0026215 | A1* | 1/2017 | Zhao | H04L 25/0224 |
| 2018/0183641 | A1* | 6/2018 | Lin | H04L 25/03834 |
| 2018/0254937 | A1* | 9/2018 | Dore | H04L 27/264 |

OTHER PUBLICATIONS

Du J. et al., "Novel Preamble-Based Channel Estimation for OFDM/OQAM Systems", IEEE International Conference on Communications, Jun. 14, 2009 (Jun. 14, 2009), pp. 1-6, XP031506200.

Fusco T. et al., "Joint symbol timing and CFO estimation in multiuser OFDM/OQAM systems", Signal Processing Advances in Wireless Communications, Jun. 21, 2009 (Jun. 21, 2009), pp. 613-617, XP031487900.

Hu S. et al., "Preamble Design with ICI Cancellation for Channel Estimation in OFDM/OQAM System", IEICE Transactions on Communications, Communications Society, vol. E93B, No. 1, Jan. 1, 2010 (Jan. 1, 2010), pp. 211-214, XP001552510.

Rodrigues R. et al., "Training Sequence Design for Channel Estimation with Nonlinear OQPSK-Type Modulations", Vehicular Technology Conference (VTC FALL), Sep. 3, 2012 (Sep. 3, 2012), pp. 1-5, XP032294626.

Goljahani A. et al., "Superimposed technique for OFDM/OQAM based digital terrestrial television broadcasting", Electrical and Electronics Engineers in Israel. 2008, IEEE 2008, IEEE 25th Convention of, Dec. 3, 2008 (Dec. 3, 2008), pp. 323-327, XP031399589.

Thein Christoph et al., "Frequency-domain processing for synchronization and channel estimation in OQAM-OFDM systems", 2013 IEEE 14th Workshop on Signal Processing Advances in Wireless Communications (SPAWC), Jun. 16, 2013 (Jun. 16, 2013), pp. 634-638, XP032490342.

Su Hu et al., "Iterative channel estimation for short preamble based OFDM/OQAM system", Communications, Circuits and Systems, 2009, ICCCAS 2009, Jul. 23, 2009 (Jul. 23, 2009), pp. 27-31, XP031528981.

Written Opinion of the International Searching Authority dated Dec. 18, 2015 for corresponding International Application No. PCT/FR2015/052582, filed Sep. 29, 2015.

French Search Report and Written Opinion dated Jun. 2, 2015 for corresponding French Application No. 1459532, filed Oct. 3, 2014.

Lele et al, "2 dB better than CP-OFDM with OFDM/OQAM for preamble-based channel estimation," published in the Proceedings of the ICC conference (International Conference on Communications), which was organized in May 2008.

Chu et al., "Polyphase codes with good periodic correlation properties", IEEE Transactions on Information Theory, pp. 531-532, in 1972.

Gasazza,"Finite Frame: Theory and Applications", published by the publisher Springer, in 2010, p. 229.

"Multi-carrier modulation analysis and WCP-COQAM proposal", by Lin et al, in the EURASIP Journal on Advances in Signal Processing in 2014.

English Translation of the Written Opinion of the International Searching Authority dated Dec. 18, 2015 for corresponding International Application No. PCT/FR2015/052582, filed Sep. 29, 2015.

3GPP LTE TS 36.211 V9.1.0, Mar. 2010 (Mar. 2010).

* cited by examiner

FIG. 1

| ZC1 | 0 | |
| 0 | 0 | |
| ZC2 | 0 | |
| 0 | 0 | |
| ZC3 | 0 | Data |
| 0 | 0 | |
| ... | ... | |
| 0 | 0 | |
| ZCMi/2 | 0 | |
| 0 | 0 | |

| BJ1 | 0 | |
| 0 | 0 | |
| BJ2 | 0 | |
| 0 | 0 | |
| BJ3 | 0 | Data |
| 0 | 0 | |
| ... | ... | |
| 0 | 0 | |
| BJM/2 | 0 | |
| 0 | 0 | |

MSE  FIG. 13a

METHOD FOR TRANSMITTING A MULTI-CARRIER SIGNAL, A RECEIVING METHOD, DEVICES, AND ASSOCIATED COMPUTER PROGRAMS

CROSS-REFERENCE TO RELATED APPLICATIONS

This Application is a Section 371 National Stage Application of International Application No. PCT/FR2015/052582, filed Sep. 29, 2015, the content of which is incorporated herein by reference in its entirety, and published as WO 2016/051062 on Apr. 7, 2016, not in English.

FIELD OF THE INVENTION

The field of the invention is that of the transmission of digital information, in particular broadband transmission, over a limited frequency band.

More precisely, the invention relates to a technique for transmitting and receiving a multi-carrier signal, making it possible, in reception, to estimate the transmission channel, for example in a mobile radio environment.

In particular, the technique according to the invention is well adapted to the transmission of multiple carrier signals having undergone an OFDM/OQAM (for «Orthogonal Frequency Division Multiplexing/Offset Quadrature Amplitude Modulation») or BFDM/OQAM (for «Biorthogonal Frequency Division Mutiplexing/OQAM») modulation, for which the carriers are shaped by a prototype function.

The invention may especially, but not exclusively, apply to asynchronous transmissions of digital information by a large number of customer devices, for example such as sensors to a well device, such as a base station, in a context of massive machine communication or MMC, via a $5^{th}$ generation mobile communication network.

STATE OF THE ART

The OFDM/OQAM modulation is an alternative to the conventional OFDM modulation. It differs from the OFDM modulation in particular by the fact that it transmits real-value data elements without a guard interval. On the other hand, the spectral efficiency of the OFDM/OQAM is identical to that of the conventional OFDM without guard interval. Indeed, by selecting v0 as the spacing between two carriers of the multiplex and τ0 the temporal spacing between two real-value symbols, is transmitted for a same inter-carrier spacing v0:

In OFDM/OQAM, a real value by carriers, all the time intervals τ0;

In classic OFDM without guard interval, a complex value (i.e. two real values) every 2×τ0=Tu.

In other words, the spectral efficiency of the OFDM/OQAM is (Tg+2τ0)/2τ0 times greater than that of classic OFDM with a duration of guard interval Tg.

Furthermore, although the OFDM/OQAM modulation is generally implemented according to a synchronous communication mode, i.e. that a transmitting device transmits a modulated signal at a known predefined instant of the transmitter unit, the inventors have found that the OFDM/OQAM I modulation was more robust to an asynchronous mode of communication than the conventional OFDM modulation. It thus constitutes a good candidate for the transmission of information by sensor devices to a well device in an MMC context.

However, a disadvantage of the OFDM/OQAM-type modulation techniques is that the orthogonality condition is only realised for the real values of the symbols to be transmitted, which raises a problem of estimating the reception, in particular the estimation of the transmission channel, insofar as the symbols received are complex.

In a mobile radio environment, the transmitted wave undergoes multiple reflections during its travel, and the receiver therefore receives a sum of delayed versions of the transmitted signal. Each of these versions is attenuated and phase shifted randomly. This phenomenon, known as delay spread, generates an interference between symbols (IBS). In particular, IBS means interference between time symbols and/or between carriers. For example, in an urban-type environment, the delay spread is of the order of or less than a few microseconds.

Since the receiver, for example a mobile telephone, is assumed to be in motion, the so-called Doppler effect also acts on each path, which results in a frequency offset of the received spectrum, proportional to the displacement speed of the mobile.

To combat these various phenomena (due to the IBS and the Doppler effect), it has been envisaged in OFDM type systems to add a guard interval, during which no useful information is transmitted, so as to ensure that all information received comes from a single symbol. In the case of coherent demodulation of the subcarriers, the distortion provided by the channel is then corrected by estimating its value at any point of the time/frequency network.

The introduction of such a guard interval thus makes it possible to reduce the phenomena associated with the interference between symbols.

However, a major disadvantage of this technique is reduced spectral efficiency, whereas no useful information is transmitted for the duration of the guard interval.

Conversely, the OFDM/OQAM and BFDM/OQAM modulation techniques do not require the introduction of a guard interval or a cyclic prefix, while presenting the same spectral efficiency as a conventional OFDM modulation.

The distinct characteristics of the multi-carrier modulations which are real on the one hand and complex on the other hand, induce different treatments when implementing a transmission channel estimate, the latter being made more delicate.

Indeed, for real-type modulations, for example OFDM/OQAM or BFDM/OQAM, the fact of having an orthogonality of the translated in the real sense makes the channel estimation process trickier.

In particular, in order to estimate the complex gain of the channel on a given subcarrier, it is necessary to implement the complex projection of the signal received on the subcarrier in question. However, the orthogonality of the translated in the real sense and the fact that the prototype functions, even when optimally localised in time and frequency, are infinitely supported on at least one of the two temporal or frequency axes, imply that even on an ideal channel, (intrinsic) interference between carriers is generated.

In particular, the imaginary part of the projection of the signal received on the basis of the translated of the prototype function is not zero. A disturbing term is then added to the demodulated signal, which must be corrected before the channel estimation. It is therefore necessary to design methods for compensating for this loss of complex orthogonality, thus overcoming at least some disadvantages of this technique of the prior art for OFDM/OQAM or BFDM/OQAM type modulations.

Let us consider for example the received signal as y(t).

It is assumed in particular that the choice of the parameters of the multi-carrier modulation ensures that the channel can be considered as flat on each of the subcarriers for each OFDM/OQAM symbol. The channel can then be modelled by a complex coefficient per subcarrier, denoted $H_{m,n}$, where m is the index of the subcarrier and n that of the OFDM/OQAM symbol.

We then use the complex projection of the multicarrier signal at the point $(m_0, n_0)$ of the time/frequency space to estimate the transmission channel $\hat{H}_{m_0,n_0}$ at this location. Thus, if $a_{m_0,n_0} = \sqrt{E}$ is transmitted at this location, we have:

$$H_{m_0,n_0} = \frac{\int y(t) g^*_{m,n}(t) dt}{\sqrt{E}} \quad (1)$$

With g as the prototype function used by the modulator
Assuming that the channel is ideal, (y(t)=s(t)), one should therefore have $$\hat{H}_{m_0,n_0} = 1.$$

Still, considering $a_{m_0,n_0}^{(c)} = \langle s, g_{m_0,n_0} \rangle_C = \int s(t) g_{m_0,n_0}^*(t) dt$,
We have:

$$a_{m,n}^{(c)} = \sqrt{E} + \Sigma_{(m,n) \neq (m_0,n_0)} a_{m,n} \int (t) g_{m_0,n_0}^*(t) dt = \sqrt{E} + I_{m_0,n_0} \quad (2)$$

with $I_{m_0,n_0} \in jR$ where $\langle , \rangle_C$ denotes the scalar product in complex vector space.

Equation (2) reflects the fact that the complex projection of the perfectly transmitted signal is nevertheless affected by an interference between symbols (IBS) intrinsic to OFDM/OQAM or BFDM/OQAM, denoted $I_{m_0,n_0}$.

In particular, the existence of this interference between symbols strongly disturbs the estimation of the transmission channel, and consequently the estimation of the symbols.

We know from the article by Lele et al, entitled "2 dB better than CP-OFDM with OFDM/OQAM for preamble-based channel estimation," published in the Proceedings of the ICC conference (International Conference on Communications), which was organised in May 2008, a technique for transmitting and receiving an OFDM/OQAM type multi-carrier signal called IAM-I (Interference Approximation Method-Imaginary) for receiving an estimate of the receiving channel.

In connection with FIG. 1, a preamble SP formed of at least three consecutive symbols consisting of pilots is inserted in the multi-carrier signal on the transmission side. The central symbol SP2 comprises a sequence of one or more groups of pilots, at least one of the groups comprising a first pilot with a real value, at least one second pilot with a pure imaginary value and with a sign opposite to that of the first pilot and a third pilot with a real value and a sign opposite to that of the first pilot. The first symbol SP1 and the third symbol SP3 are formed of zero values. This distribution of pilots by triplet makes it possible in particular to estimate the transmission channel by taking advantage of the inter-symbol interferences generated in order to reduce the noise.

Indeed, if we consider a triplet of pilots $\{a_{m0-1,n0}, a_{m0,n0}, a_{m0+,n0}\}$, with $m_0$ a non-zero integer and smaller than M−1, the number of carriers assigned to the customer device and $n_0$ is an integer. According to the IAM-I technique, the triplet takes on the following values:

$$\begin{aligned} a_{m0-1,n0} &= -1 \text{ or } 1 \\ a_{m0,n0} &= j \cdot a_{m0-1,n0} \\ a_{m0+1,n0} &= -a_{m0-1,n0} \end{aligned} \quad (3)$$

After passing through the transmission channel for the pilot $a_{m_0,n_0}$ transmitted on the carrier $m_0$ at time $n_0$, a complex signal $y_{m0,n0}$ is received by the transmitter unit at location $m_0, n_0$, which can be expressed as follows:

$$Y_{m0,n0} = H_{m0,n0} \cdot (a_{m0,n0} + I) + b \quad (4)$$

With $H_{m0,n0}$ the representative coefficient of the transmission channel Im0,n0 the interference created at this location, b the noise component $$Y_{m0,n0} = H \cdot (j a_{m0-1,n0} + I) + b$$

The frequency response $\hat{H}_{m0,n0}$ of the transmission channel can thus be expressed as follows:

$$\hat{H}_{m0,n0} = \frac{Y}{j a_{m0,n0} + I} = H_{m0,n0} + \frac{b}{j a_{m0,n0} + I_{m0,n0}} \quad (5)$$

Assuming the transmission channel as constant, the interference component can be expressed as follows:

$$I_{m0,n0} = \Sigma_{m,n \neq m_0,n_0} a_{m,n} \int g_{m,n}(t) g_{m,n}^*(t) dt \quad (6)$$

Where $m,n = m_0+1, n_0$; $m_0-1, n_0$ corresponding to the positions of neighbouring non-zero symbols and therefore likely to create interference at the position $m_0 n_0$, and g the prototype function implemented by the modulation technique OQAM.

The above expression is simplified by:

$$I_{m0,n0} = (a_{m0+1,n0} \cdot \beta - a_{m0-1,n0} \cdot \beta) \cdot j$$

$$I_{m0,n0} = 2 a_{m0-1,n0} \cdot \beta \cdot j \quad (7)$$

With $\beta$ a constant whose value depends on the prototype g implemented by the modulation OQAM.
We shall now assess the denominator of the term $$\frac{b}{j a_{m0,n0} + I}$$

of the equation (4)

$$j \cdot a_{m0-1,n0} + I_{m0,n0} = j \cdot a_{m0-1,n0} \cdot (1 + 2 \cdot \beta)$$

We thus obtain:

$$|j \cdot a_{m0-1,n0} + I_{m0,n0}|^2 = |1 + 2\beta|^2 > 1$$

The absolute value of the denominator of this term being greater than 1, the noise component b is therefore reduced by the interferences generated between the pilots of the triplet.

Shortcomings of Prior Art

A first shortcoming of this technique is that it produces a multi-carrier signal having a high Peak To Average Power Ratio (PAPR) value.
This is due in particular to the periodicity of the sequence of pilots inserted in the multi-carrier signal. Due to this periodicity, the absolute values of the pilots of the sequence accumulate at the input of the frequency transform implemented during transmission.

However, in an MMC context, the customer device generally consists of sensors subjected to high energy constraints. Managing a high PAPR value results in increased energy consumption at the transmitter unit, which is incompatible with such constraints.

A second shortcoming of the IAM-I technique lies in that it is not adapted to a multi-user reception context when the receiving device has allocated to at least two customer devices the same set of carriers, because the sequences of pilots transmitted by the customer device are not specific to each customer and the signals transmitted by each of them are therefore not separable.

SUMMARY OF THE INVENTION

An exemplary aspect of the present disclosure relates to a method for transmitting a multi-carrier signal implementing an OQAM-type modulation intended for transmission via a channel transmission system, formed by a temporal succession of symbols consisting of a set of data elements comprising:

Real-value informative elements of data and

For at least some of said symbols, elements of reference data, so-called pilots, known by at least one receiver designed for receiving the multi-carrier signal.

As each of said data elements modulates a carrier frequency of said signal, a carrier frequency modulated by one of said data elements being called a carrier, A set of carriers being allocated to a transmitter unit.

According to the invention, said transmission method comprises a step of inserting a sequence of pilots specific to said transmitter unit at a given time into the multi-carrier signal on said allocated set of carriers, said sequence of pilots comprising:

a sequence of non-zero complex values, inserted on odd or even carriers, alternating with zero values, inserted on the other carriers, respectively even or odd-numbered, non-zero complex values of the sequence of pilots, their frequency transforms and inverse frequency transforms being with a constant envelope, and a sequence of zero values modulating the carriers of the set of carriers allocated at the next time.

With the invention, the sequence of pilots forms a preamble, comprising an alternation of non-zero complex values and of zero values inserted at a given time of the time-frequency space over the set of carriers allocated to the transmitter unit and, at the following time of zero values over the set of allocated carriers.

The transmission of pilots therefore benefits from a time-frequency neighbourhood which creates few inter-symbol interferences, which guarantees a transmitter unit to benefit from favourable conditions for estimating the transmission channel.

The duration of the preamble has a symbol time.

Thus, the invention relies on an entirely novel and inventive approach of the transmission of pilots in a multi-carrier signal for estimating a transmission channel, which consists in limiting the level of inter-symbol interferences generated.

Unlike the prior art which inserts groups of at least three pilots comprising at least one pilot having a real value and a pilot having a pure imaginary value of opposite sign and a pilot having a real value of opposite sign to the first pilot, the invention inserts alternating non-zero complex values with zero values on the even and odd carriers of the same symbol time.

The non-zero complex values of the sequence of pilots according to the invention are further chosen in such a way that the modulated signal produced has a constant envelope, as well as any time-frequency transform of this signal and any inverse transform of this time-frequency transform. This property makes it possible to guarantee a reduced value of PAPR and therefore reasonable constraints on the technical characteristics, the energy consumption and the cost of an RF module (for radio frequency) of the transmitter unit.

Finally, the sequence of pilots is specific to each transmitter unit, in order to allow a transmitter unit to identify the transmitter unit, when it transmits in the same frequency band as another transmitter unit.

The invention therefore makes it possible to solve the technical problem of estimating the transmission channel in a context of massively multi-user communication in which the transmitter unit is subjected to energy consumption constraints.

The invention thus benefits from the advantages of the OFDM-OQAM modulation with respect to its resiliency to asynchronism and makes it usable in a context of multi-user communication.

According to an advantageous characteristic of the invention, the sequence of non-zero complex values of the sequence of pilots is a CAZAC-type sequence of length equal to half the number of carriers allocated to the transmitter unit.

The CAZAC-type sequences all possess the properties stated in the preceding claim and necessary to the invention, in particular in terms of constant envelope. An advantage of such a sequence is that it furthermore has a zero autocorrelation, which on the receiving side enables better detection of the peaks and facilitates channel estimation.

According to another aspect of the invention, the sequence of non-zero complex values of the sequence of pilots is a Zadoff-Chu-type sequence defined by the following expression:

$$ZC(l) = e^{\frac{j\pi q l(l+1)}{N_{ZC}}}$$

With l, an index of the complex value in the sequence, q an integer corresponding to a root sequence specific to the customer device and $N_{ZC}$ is equal to the largest prime number smaller than the length of the sequence.

The Zadoff-Chu-type sequences are known in the art and detailed in the document entitled "Polyphase codes with good periodic correlation properties", published by Chu et al in IEEE Transactions on Information Theory, pp. 531-532, in 1972. Their use for channel estimation is specified in the standard TS 36 211 V9.1.0 published by the 3GPP LTE (for "Long Term Evolution"), in March 2010, in the case of signals implementing an OFDM-type modulation.

Due to their complex nature, such sequences have hitherto never been considered as exploitable for channel estimation in case of signals implementing an OFDM-OQAM-type modulation.

According to another aspect of the invention, the sequence of non-zero complex values of the sequence of pilots is a Björck-type sequence defined by the following expression:

$$BS(l) = \frac{1}{\sqrt{L}} \cdot a, \text{ with } a = \begin{cases} 1 \text{ for } l = 0 \\ e^{j(\cos(1/1+\sqrt{L}))} \text{ for } l=u^2 \bmod L \text{ and } u=1, \ldots, L-1 \\ e^{-j(\cos(1/1+\sqrt{L}))} \text{otherwise} \end{cases}$$

with l, an integer between 0 and L−1 with L, the length of the sequence.

The "Björck" sequences constitute another type of CAZAC sequence, which possess the properties necessary for the implementation of the invention. They are known to those skilled in the art and are described in detail in the document entitled "Finite Frame: Theory and Applications" by Gasazza, published by the publisher Springer, in 2010, p. 229.

According to another aspect of the invention, the non-zero complex values of the sequence of pilots are multiplied by a phase rotation factor.

This phase rotation factor allows a transmitter unit to estimate the communication channel specific to each customer device in a multi-user context, for example MU-MIMO (for "Multi Users-Multi Input Multi Output") when several customer devices transmit on the same frequency band intended for a customer device comprising several reception antennas.

According to another aspect of the invention, the sequence of pilots is inserted into the multi-carrier signal at a non-zero time and further comprises a sequence of zero-values modulating the carriers of the set of carriers allocated to the preceding time.

An advantage is to guarantee in a simple manner that a negligible amount of interference is generated because of possible data elements transmitted at the time preceding that of the preamble.

According to another aspect of the invention, the sequence of pilots is inserted into the multi-carrier signal at a non-zero time, the informative data elements inserted at a preceding time modulating the carriers of the set of allocated carriers according to a cyclic-OQAM type modulation.

The Cyclic-OQAM modulation constitutes an OQAM modulation variation which provides a decrease in the frequency spectrum so as to limit the overlaps between the spectra corresponding to sequences of symbols transmitted at consecutive emission times.

This modulation is detailed, for example, in the paper entitled "Multi-carrier modulation analysis and WCP-CO-QAM proposal", by Lin et al, in the EURASIP Journal on Advances in Signal Processing in 2014.

An advantage of this solution is that it does not increase the transmission time of the preamble, which remains equal to a symbol time.

The method which has just been described in its various embodiments is advantageously implemented by a device for transmitting a multi-carrier signal according to the invention.

Advantageously, such a device can be integrated into a transmitter unit. The invention therefore relates to a transmitter unit capable of transmitting a multi-carrier signal implementing an OQAM type modulation, comprising a transmission device according to the invention.

Correlatively, the invention also relates to a method for receiving a multi-carrier signal corresponding to at least one multi-carrier signal implementing an OQAM-type modulation, transmitted by at least one transmitter unit via a transmission channel, said signal being formed of a temporal succession of symbols consisting of a set of data elements comprising:
  Real-value informative elements of data, and
  For at least some of said symbols, elements of reference data, so-called pilots, known by at least one receiver designed for receiving the multi-carrier signal,
  As each of said data elements modulates a carrier frequency of said signal, a carrier frequency modulated by one of said data elements being called a carrier,
  A set of carriers being allocated to a transmitter unit.
  According to the invention, a sequence of pilots specific to said transmitter unit was inserted into the multi-carrier signal on said allocated set of carriers, said sequence of pilots comprising:
    a sequence of non-zero complex values, inserted on odd or even carriers, alternating with zero values, inserted on the other carriers, respectively even or odd-numbered, at a given time,
    non-zero complex values of the sequence of pilots, their frequency transforms and inverse frequency transforms being with a constant envelope, and
    a sequence of zero values modulating the carriers of the set of carriers allocated at the following time,
  and the receiving method comprises:
    A step of extracting complex values corresponding to non-zero values of the sequence of pilots on the odd or even carriers, after passing through the transmission channel,
    A step of estimating a frequency response of said transmission channel on the odd or even carriers from the complex values extracted, and
    A step of estimating a frequency response of said transmission channel on the other carriers, respectively even or odd by frequency interpolation of the channel response, estimated on the even or odd carriers.

According to one aspect of the invention, the set of carriers having been allocated to at least one second transmitter unit, said method further comprises a step of time-inverse frequency transformation for separating, on the carriers of the allocated set of carriers, the components from a first multi-carrier signal transmitted by the first transmitter unit from those originating from at least one second multi-carrier signal transmitted by at least one second customer device.

In this way, the responses of the communication channel specific to each transmitter unit can be estimated, in a multi-user context.

The method which has just been described in its various embodiments is advantageously implemented by a device for receiving a multi-carrier signal according to the invention.

Advantageously, such a device can be integrated to a receiver unit, for example a base station or an access point. The invention therefore relates to a receiver unit capable of receiving a multi-carrier signal implementing an OQAM type modulation transmitting by at least one transmitter unit, comprising a transmission device according to the invention.

The invention also relates to a data signal carrying a multi-carrier signal implementing an OQAM-type modulation, formed by a temporal succession of symbols consisting of a data set comprising:
  Real-value informative elements of data, and
  For at least some of said symbols, elements of reference data, so-called pilots, known by at least one receiver designed for receiving the multi-carrier signal, As each of said data elements modulates a carrier frequency of said signal, a carrier frequency modulated by one of said data elements being called a carrier, A set of carriers being allocated to a transmitter unit.

According to the invention, said multi-carrier signal comprises a sequence of pilots specific to said transmitter unit inserted at a given time on said allocated set of carriers, and said sequence of pilots comprises:

non-zero complex values, inserted on odd or even carriers, alternating with zero values, inserted on the other carriers, respectively even or odd, the non-zero complex values of the sequence of pilots, their frequency transforms and inverse frequency transforms being with a constant envelope, and and a sequence of zero values modulating the carriers of the set of carriers allocated at the following time.

The invention also relates to a computer program comprising instructions for implementing the steps of a method for transmitting a multi-carrier signal as described above, when this program is executed by a processor.

The invention also relates to a computer program comprising instructions for implementing the steps of a method for receiving a multi-carrier signal as described above, when this program is executed by a processor.

These programs can use any programming language. They can be downloaded from a communication network and/or recorded on a computer-readable medium.

Finally, the invention relates to recording media, which can be read by a processor, integrated or not into the encoding device for transmitting a multi-carrier signal and the device for receiving a multi-carrier signal according to the invention, optionally removable, storing respectively a computer program implementing a method for transmitting a multi-carrier signal and a computer program implementing a method for receiving a multi-carrier signal, as described above.

LIST OF FIGURES

Other advantages and characteristics of the invention will appear more clearly on reading the following description of a particular embodiment of the invention, given by way of a simple illustrative and non-limiting example and of the appended drawings, among which:

Figure 1:
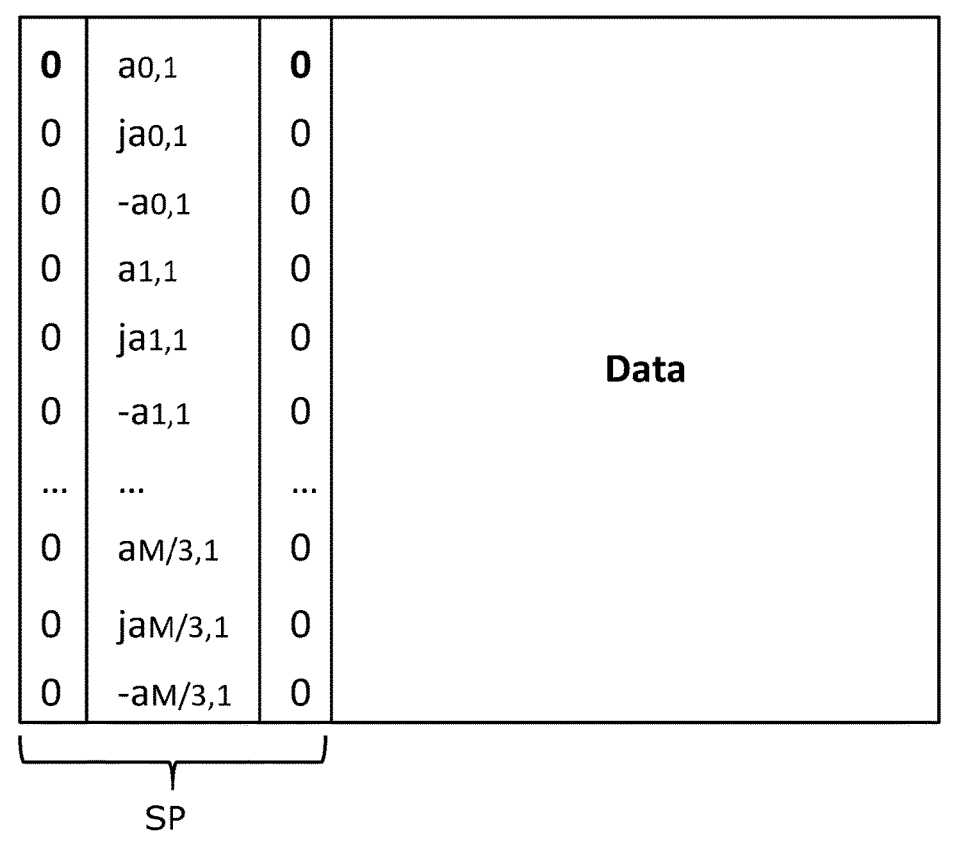

FIG. 1 (already described) shows an example of sequence of pilots inserted into a multi-carrier signal implementing an OFDM/OQAM-type modulation, according to the prior art;

FIG. 6 shows an example of a preamble structure according to a first embodiment of the invention;

FIG. 7 shows an example of a preamble structure according to a second embodiment of the invention;

Figure 8:
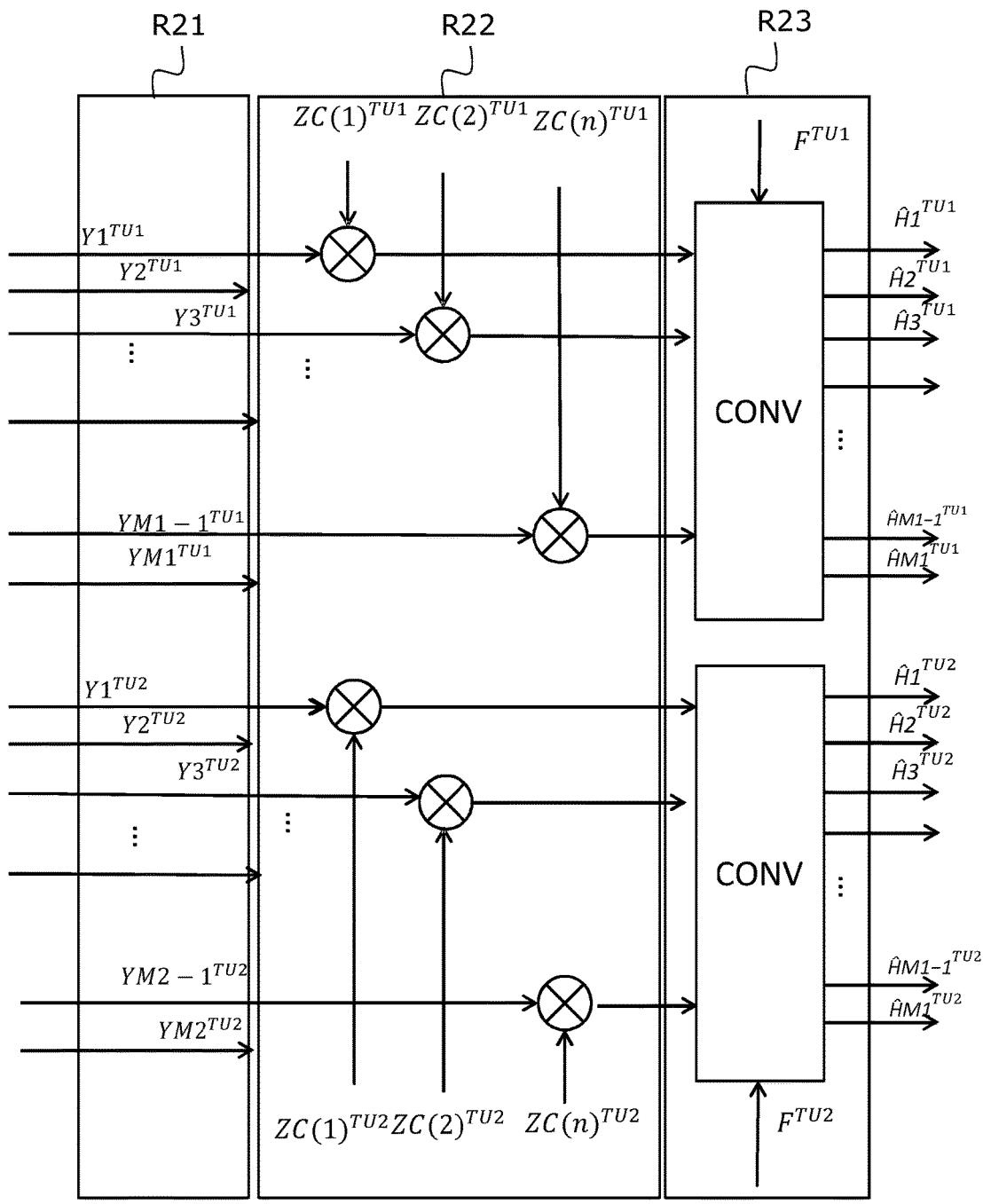
Figure 9:
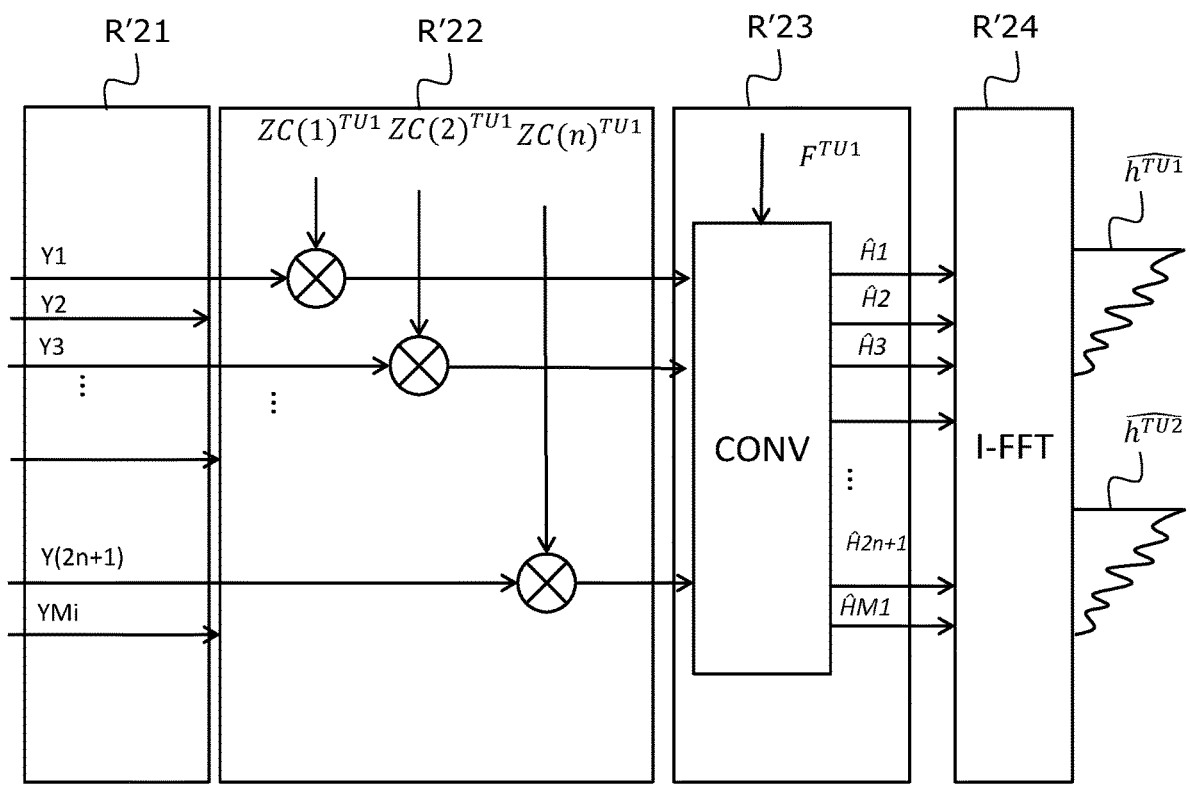
Figure 11:
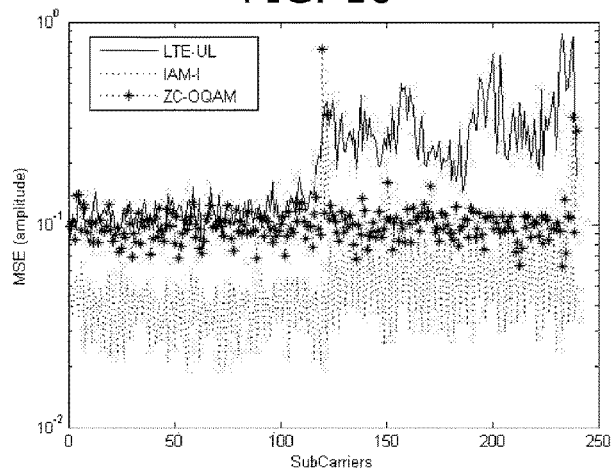
Figure 12A:
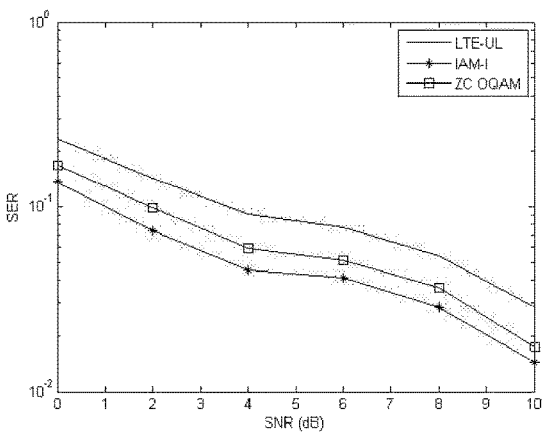
Figure 12B:
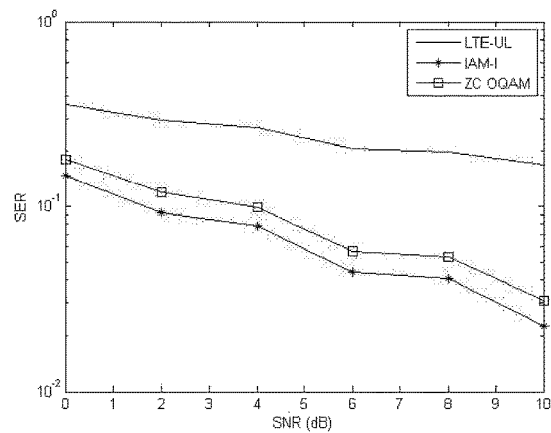
Figure 13B:
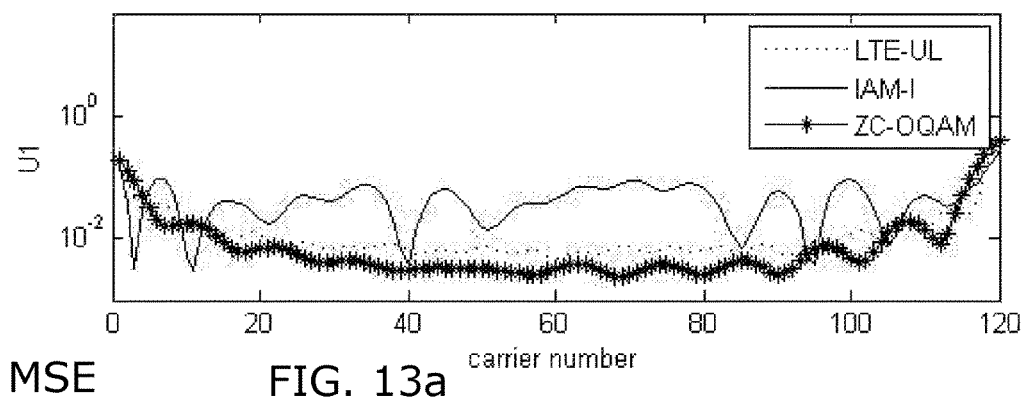
Figure 13B:
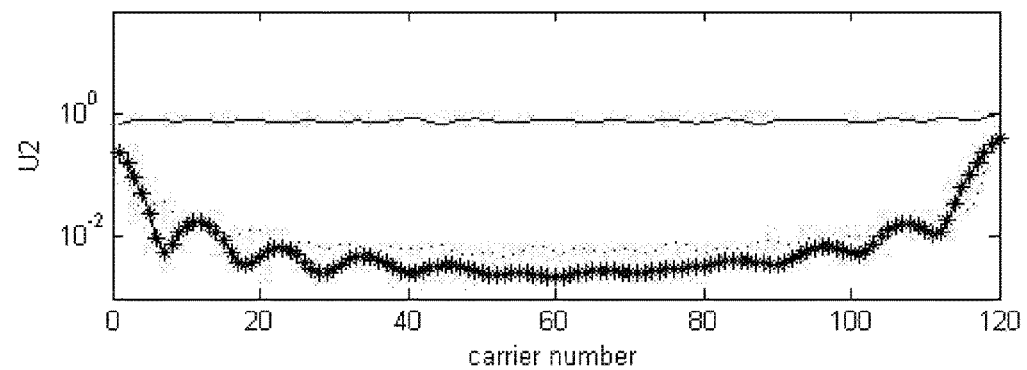

FIG. 8 details the channel estimation step of the reception method according to a first embodiment of the invention;

FIG. 9 details the channel estimation step of the reception method according to a second embodiment of the invention;

FIGS. 10, 11, 12a and 12b show results obtained by the method for receiving a multicarrier signal according to the invention, when both pieces of transmitter units simultaneously transmit data at the same receiver unit on separate frequency bands; and FIGS. 13a and 13b show results obtained by the method for receiving a multicarrier signal according to the invention, when both transmitter units simultaneously transmit data at the same transmitter unit on the same frequency band.

DESCRIPTION OF A PARTICULAR
EMBODIMENT OF THE INVENTION

The general principle of the invention relies on the insertion by a transmitter unit in a multi-carrier signal modulated according to an OFDM/OQAM-type modulation of a sequence of pilots at a given time TS, known to the receiver unit, said sequence of pilots comprising alternating complex values modulating the odd (or even) carriers and zero values carried by the even (or odd) carriers of the set of carriers allocated to the transmitter unit or vice versa, and on the insertion of a sequence of zero values modulating the carriers of the set of carriers allocated to the following time (TS+τ0).

According to the invention, the sub-sequence of non-zero complex values has particular properties of a constant envelope.

Figure 2:
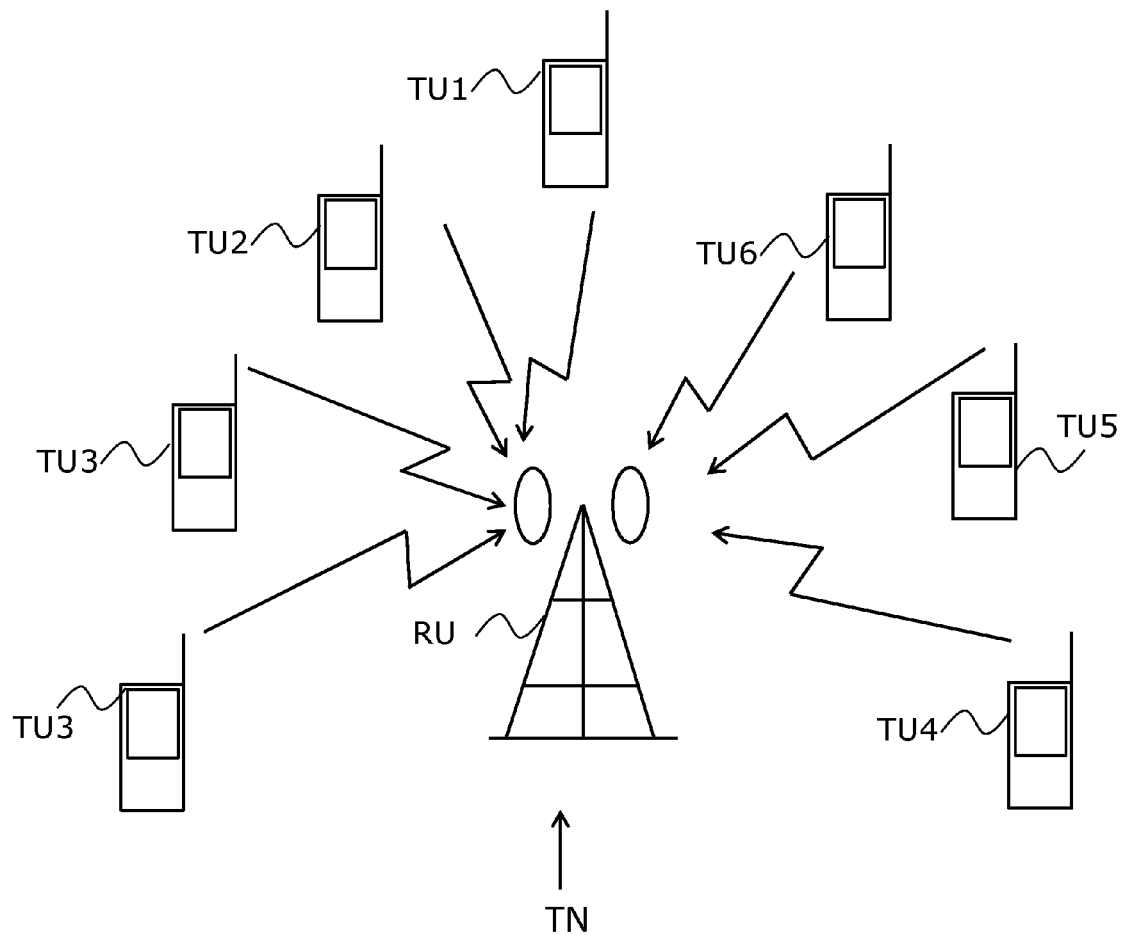
FIG. 2 shows schematically a communication system between a plurality of transmitter units and a receiver unit according to the invention.

In connection with FIG. 2, we consider a plurality of transmitter units TU1, TU2 . . . TUN, with N a non-zero integer, able to communicate by radio according to an OFDM/OQAM-type modulation with the same receiver unit RU.

The transmitter units are for example sensors arranged to collect measurement data, for example environmental or consumption data, and to feed them back to the receiver unit RU, called collector device or well device, arranged to process these data. In this case, the transmitter unit is subjected to high energy constraints.

In the following description, we focus in particular on a context of mass communication between machines or MMC already mentioned and the study in the framework of standardisation work of the $5^{th}$ generation of mobile networks by the 3GPP.

Of course, the invention is not limited to this application and relates both to communications between smartphone-type transmitter units, tablet etc. with a mobile radio receiver unit such that a base station or e-nodeB according to LTE terminology (for "Long Term Evolution") specified by the 3GPP standards body (for "3rd Generation Partnership Project") via a mobile network of $3^{rd}$ or $4^{th}$ generation. The receiver unit can also be an access point, for example a Wifi-type wireless network specified by the IEEE 802.11x standard.

In the MMC context, the transmitter units are not synchronised with the receiver unit, so they can decide to transmit a signal modulated according to an OFDM/OQAM modulation at any time.

Note that the invention which will be described in more detail, can be implemented using software and/or hardware components. In this context, the terms "module" and "entity" used in this document, can correspond either to a software component or a hardware component or even a set of hardware and/or software components, capable to implement the function(s) outlined for the module or entity concerned.

Figure 3:
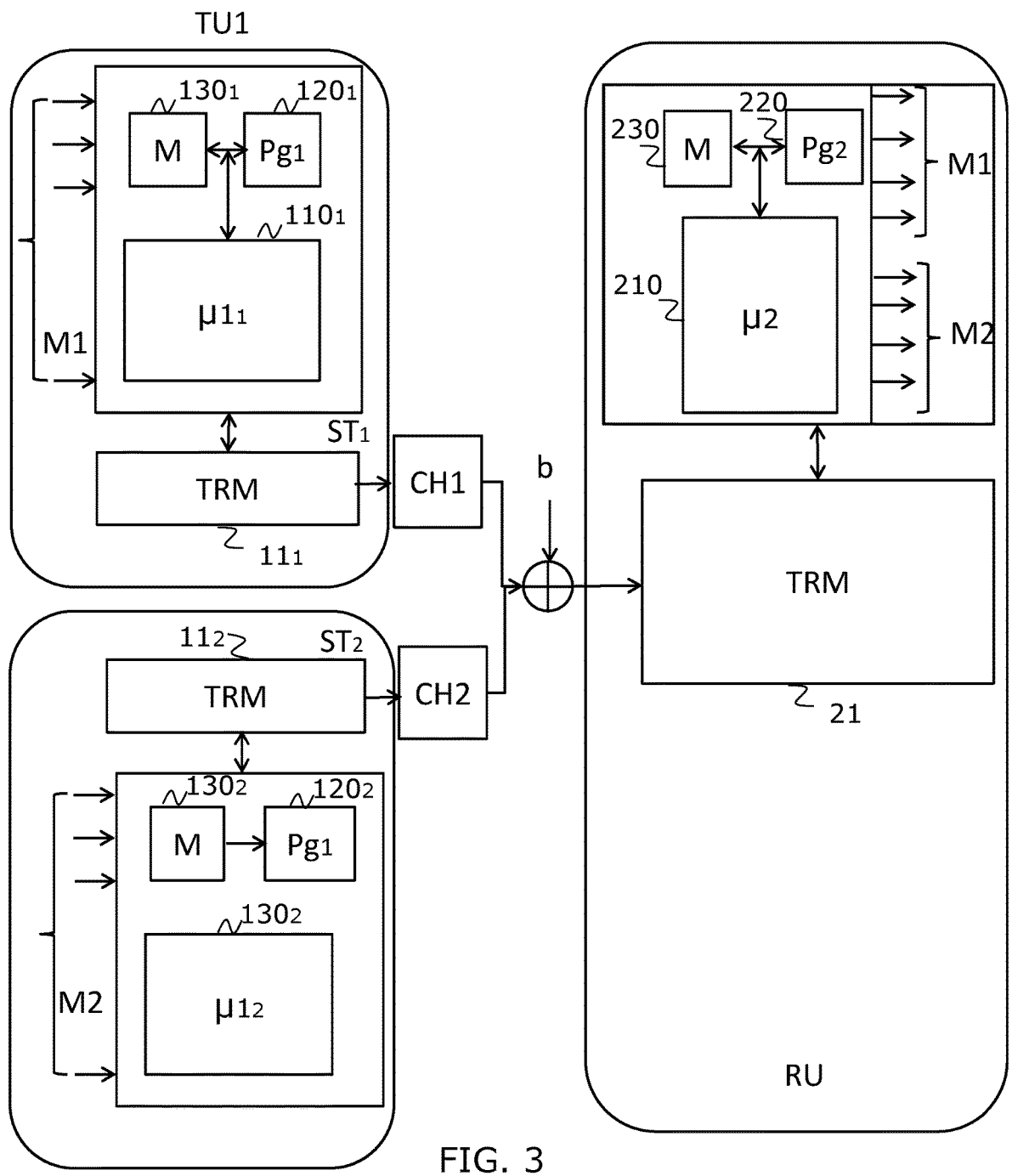
FIG. 3 shows schematically an example of a simplified structure of transmission and reception devices of a multi-carrier signal implementing an OQAM-type modulation according to the invention.

In connection with FIG. 3, we consider especially two transmitter devices TU1 and TU2 having informative data elements to be transmitted to the same receiver unit RU. The receiver unit RU has for example allocated to the first transmitter unit TU1, a first set of carriers M1 and to the second transmitter unit a second set of carriers M2, both sets can be separated (as shown) or not.

The transmitter units TU1 and TU2 respectively comprise a device $100_1$, $100_2$ for transmitting a multi-carrier signal according to the invention.

The devices $100_1$, $100_2$ implement the method for transmitting a multi-carrier signal according to the invention which will be described in more detail in connection with FIG. 4.

For example, the devices $100_1$, $100_2$, respectively, include a processing unit $110_1$, $110_2$, equipped with a processor $\mu1_1$, $\mu1_2$ and driven by a computer program $Pg_1$ $120_1$, stored in a memory $130_1$, $130_2$ and implementing the process according to the invention.

At initialisation, the code instructions of the computer programs $Pg_1$ $120_1$, $Pg_2$ $120_2$ are for example loaded into a RAM before being executed by the respective processors of the processing units $110_1$, $110_2$. The treatment of the processing unit $110_1$, $110_2$ implements the process steps described above, according to the computer program instructions $120_1$, $120_2$.

The devices $100_1$, $100_2$ are arranged to cooperate at least with a module TRM $11_1$, $11_2$ for transmitting/receiving data from the transmitter units TU1, TU2, via which the multi-carrier signals SE1, SE2 are transmitted over a telecommunications network TN, for example a mobile radio network of the $4^{th}$ generation, $5^{th}$ generation or next generation.

According to a variant of the invention, a device $100_1$, $100_2$ is integrated to the transmission/reception module $11_1$, $11_2$.

The receiver unit RU comprises a device 200 for receiving a multicarrier signal according to the invention.

The device 200 implement the method of receiving a multi-carrier signal according to the invention which will be described in more detail in connection with FIG. 5.

For example, the device 200 includes a processing unit 210, equipped with a processor $\mu2$ and driven by a computer program Pg2 220, stored in a memory 230 and implementing the method according to the invention.

At initialisation, the code instructions of the computer program $Pg_1$ 220 are for example loaded into a RAM before being executed by the processor of the processing unit 210. The processor of the processing unit 210 implements the steps of the method described above, according to the instructions of the computer program 220.

The device 200 is arranged to cooperate with at least the next module TRM 21 for transmitting/receiving data of the receiver unit RU, through which the multi-carrier signal is received from the telecommunications network TN, for example a mobile radio network of $4^{th}$ generation, $5^{th}$ generation or next generation.

According to a variant of the invention, a device 200 is integrated to the transmission/reception module 21.

Figure 4:
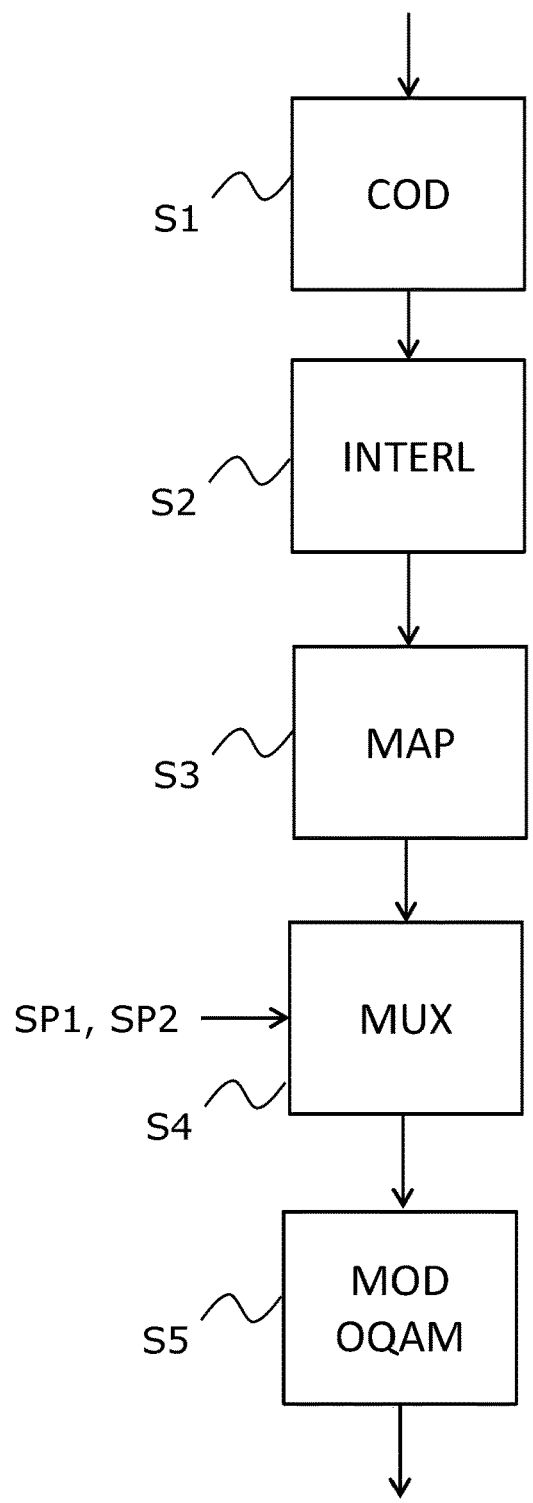
FIG. 4 shows schematically the steps of a method for transmitting a multi-carrier signal implementing an OQAM-type modulation according to the invention.

In connection with FIG. 4, we now present the steps of a method of transmitting a multicarrier signal implemented by a transmitter unit TUi, i=1 or 2, according to an exemplary embodiment of the invention. It is assumed that the transmitter TUi unit has a set of Mi carriers that has been allocated by the receiver unit RU.

At S1, the informative elements of data to be transmitted are encoded according to a channel encoding technique, implementing, for example turbo codes.

At S2, the items of encoded data are interleaved.

At S3, the items of interleaved encoded data undergo binary encoding with symbols in a constellation, for example Q-PSK, 16-QAM. The result is a sequence of symbols.

At S4, a sequence of pilots SPi is inserted by multiplexing to the sequence of complex symbols on the set of Mi carriers. According to the invention, this sequence includes a sequence SCi of non-zero complex values, of length equal to half the number of carriers allocated to the transmitter unit TUi. Such a sequence is specific to the unit TUi and shows special properties such as a constant envelope. Further in the description, two examples of complex sequences SC will be detailed in connection with FIGS. 6 and 7.

At S5, the multiplexed sequence is modulated according to an OFDM/OQAM-type modulation and the multi-carrier signal obtained is transmitted into the transmission channel CHi between the transmitter unit TUi and the receiver unit RU.

Figure 5:
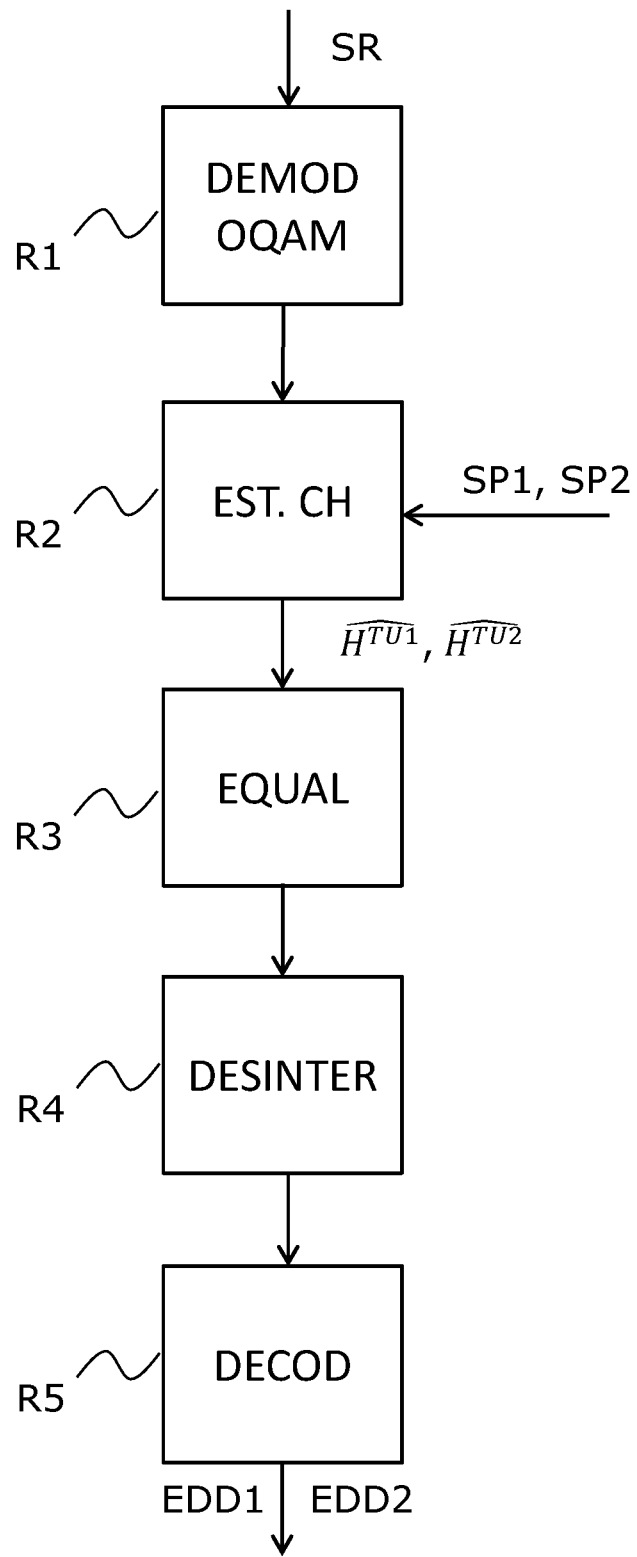
FIG. 5 shows schematically the steps of a method for receiving a multi-carrier signal implementing an OQAM-type modulation according to the invention.

In connection with FIG. 5, we now present the steps of a method of receiving a multi-carrier signal SR by the receiver unit RU according to the invention.

The received signal SR is first demodulated in a step R1.

The receiver unit RU then implements an estimate R2 of the channel response or of the communication channels CHi used by the received signal SR. Indeed, if several transmitter units TUi have each transmitted over the same time period a multi-carrier signal to the receiver unit RU, each transmitted signal STi has used, before reaching the receiver unit RU, a different communication channel CHi, which should be estimated.

This step is performed using sequences of pilots SPi specific to each transmitter unit TUi, which are known in advance by the receiver unit RU.

At R3, the component of the demodulated signal corresponding to each transmitted signal ST1, ST2, is then equalised using the estimated response of the transmission channel CH1, CH2 estimated in R2, then dis-interleaved in R4, and finally decoded into R5 to obtain the decoded informative data items UDD1, UDD2 transmitted by each of the transmitter units TU1, TU2.

In connection with FIG. 6, we now present a first example of a sequence of pilots SP inserted by a transmitter unit TUi into a multi-carrier signal for the receiver unit RU according to the invention.

The sequence SP comprises a subsequence of non-zero complex Zadoff Chu type values.

A Zadoff-Chu type sequence is expressed as follows:

$$ZC(l) = e^{\frac{j\pi q l(l+1)}{N_{ZC}}} \qquad (8)$$

l is an integer between 1 and L, L being equal to half the number of carriers allocated to the transmitter unit TUi.

q is a root sequence specific to the customer unit TUi, $N_{ZC}$ is the largest prime number less than half the number of carriers Mi allocated to the customer unit TUi, n being an integer between 1 and Mi/2.

A Zadoff-Chu type sequence is known to those skilled in the art as belonging to the family of the CAZAC sequences. It therefore shows its particular properties, especially as regards the constant envelope.

In connection with FIG. 7, we now present a second example of a sequence of pilots SP' inserted by a transmitter unit TUi into a multi-carrier signal for the receiver unit RU according to the invention.

The sequence comprises a subsequence of non-zero complex Björck type values.

A Björck type sequence is expressed as follows:

$$BS(l) = \frac{1}{\sqrt{L}} \cdot a, \text{ with } a = \begin{cases} 1 \text{ for } l = 0 \\ e^{j(\cos(1/1+\sqrt{L}))} \text{ for } l=u^2 \bmod L \text{ and } u=1, \ldots, L-1 \\ e^{-j(\cos(1/1+\sqrt{L}))} \text{otherwise} \end{cases} \quad (9)$$

With I, an integer between 0 and L−1 with L, the length of the sequence. As in the first example, it is equal to half the number of carriers Mi allocated to transmitter unit TUi.

A Björck type sequence is known to those skilled in the art as belonging to the family of the CAZAC sequences. It therefore shows its particular properties, especially as regards the constant envelope.

In relation to FIG. 8, it is now details the channel estimation step R2 implemented according to a first embodiment of the invention. For example, let us consider a sequence of pilots comprising a sub-sequence of Zadoff-Chu type complexes.

As in the example of FIG. 3, let us consider two transmitter units TU1 and TU2 which each transmit a multicarrier signal ST1, ST2 to a receiver unit RU.

The receiver unit RU has previously allocated to them respectively a set of carriers M1 and a set of carriers M2, which are assumed as distinct.

For example, it is considered that the receiver unit RU has allocated 4 resource blocks RB to customer unit TU1.

It is considered, as in the specifications 3GPP LTE, a resource block RB includes 12 carriers. The customer unit TU1 therefore has a band of M1=48 carriers. It is further assumed that the receiver unit RU has attributed the root sequence $q_1$=1 to the customer unit TU1.

It is considered that the receiver unit RU has allocated 5 resource blocks RB to the customer unit TU2. The customer unit TU2 therefore has a band of M2=60 carriers. It is further assumed that the receiver unit RU has attributed the root sequence q2=2 to the customer unit TU2.

The Zadoff-Chu sequence of the customer unit TU1 is therefore of length $M_1/2$=24, the largest prime number less than 24 is $N_Z$=23 and the elements of the sequence are expressed as follows:

$$ZC^{TU1}(l) = e^{\frac{j\pi q_1 l(l+1)}{N_{ZC}}} = e^{\frac{j\pi l(l+1)}{23}} \text{ for } n \text{ ranging between 1 and 23} \quad (10)$$

$$ZC^{TU1}(24) = ZC^{TU1}(1) \quad (11)$$

The 24 elements of the sequence are inserted on the 24 odd carriers of the set M1 of carriers allocated to TU1.

The Zadoff-Chu sequence of the customer unit TU2 is therefore of length $M_1/2$=30, the largest prime number less than 30 is $N_{ZC}$=29 and the elements of the sequence are expressed as follows:

$$SC2 = \quad (12)$$
$$ZC^{TU2}(l) = e^{\frac{j\pi q_2 l(l+1)}{N_{ZC}}} = e^{\frac{j\pi l(l+1)}{29}} \text{ for } l \text{ ranging between 1 and 29}$$

$$SC2 = ZC^{TU2}(30) = ZC^{TU2}(1) \quad (13)$$

On the transmitters side, the sequence SCi of the transmitter unit TUi is first inserted on the odd carriers of the band allocated to the transmitter unit TUi when multiplexing at the input of the OQAM modulation.

Zero values are inserted on the rest of the carriers, that is to say the even-numbered carriers.

In this embodiment of the invention, it is considered that each transmitter unit TUi inserts its sequence of pilots SPi at a time TS=0 of the multi-carrier signal TUi that it transmits. It begins by transmitting a preamble before sending useful data.

This case is particularly suited to an environment of asynchronous communication such as that of communications MMC in which the transmitter unit must be able to transmit data elements, for example measurements to a collector unit, at any time so requested.

It follows that no useful data precedes the sequence $SCi = ZC^{TUi}$.

Then the modulated signals STi are transmitted in communication channels CHi.

On the receiver side RU, a single signal SR is received, resulting from this combination and after passing through the communication channels CHi.

Note that in the asynchronous case, unlike the synchronous case, the receiver unit does not determine for a transmitter unit TUi, depending on its communication channel CHi, a transmission time of its signal STi so that it is received at a predetermined time. Instead, the receiver unit does not know the arrival time of the data transmitted by the unit TUi.

Following demodulation of the signal received at R1, the channel estimation step R2 implements the following sub-steps:

In R21, extracting the complex values corresponding to the non-zero values of the sub-sequence SC of the frequency of pilots SP modulating the odd carriers of the set of carriers allocated to TUi, after passing through the transmission channel CHi, estimating in R22 an impulse response $\tilde{h}^{TUi}$ of the transmission channel CHi on the odd carriers of the set Mi allocated to the transmitter unit TUi. During this step, the complex values extracted on the odd carriers are multiplied by the conjugate of the corresponding complex value of the sequence SCi specific to the customer unit TUi.

Indeed, if we designate by $y_{2n+1}^{TUi}$ the complex value derived from the carrier 2n+1 with n, an integer between 0 and Mi/2 is expressed as follows:

$$y_{2n+1}^{TUi} = H_{2n+1}^{TUi} \cdot (SC_{2n+1}^{TUi} + I) + b \quad (14)$$

However, because of the construction of the sequence of pilots SPi and its positioning to TS=0, each non-zero complex value of the sub-sequence SCi is surrounded by neighbouring zero values, so that the interference component I may be considered negligible.

We obtain:

$$y_{2n+1}^{TUi} = H_{2n+1}^{TUi} \cdot SC_{2n+1}^{TUi} + b$$

It follows that we can estimate the ratio of the communication channel CHi for the carrier mi=2n+1, by multiplying the complex value derived from the carrier mi (odd) by the conjugate of the corresponding complex value of the sequence SCi specific to the customer unit UEi, as follows:

$$\hat{H}_{2n+1}^{TUi} = y_{2n+1}^{TUi} \cdot [SC_{2n+1}^{TUi}]^* \quad (14)$$

At the end of R21, we have an estimate of the frequency response of the communication channel CHi on the odd carriers.

The channel estimation step finally includes an estimate R23 of the frequency response of the transmission channel on the odd carriers, that is to say those corresponding to zero values of the sequence of pilots by interpolation of the estimated values on the even-numbered carriers. Advantageously, this step implements a convolution of the estimated frequency response on the odd carriers with a preset filter $F^{TUi}$ for example a low-pass filter.

At the end of this sub-step, we have an estimate of the communication channel CHi on all the carriers of the set Mi allocated to the unit TUi.

Alternatively, we now consider that the sequence of pilots is inserted at a non-zero time TS. In this case, to prevent interference between symbols from being generated, at least two embodiments of the invention are envisaged:

- a sequence of zero values is inserted at the time TS−τ0 preceding the transmission time of the sub-sequence SC of non-zero complex values;
- the informative elements of data transmitted at the time TS−τ0 preceding the transmission time are modulated over the set of carriers Mi allocated to the unit TUi according to a particular OQAM modulation, such as a Cyclic-OQAM, which minimises spectral overlap between two successive times.

In relation to FIG. 9, we shall now detail the channel estimation step R'2 implemented according to a second embodiment of the invention. For example, let us consider a sequence of pilots comprising a sub-sequence of Zadoff-Chu type complexes.

In this second example, we consider in particular the sets of carrier M1, M2 allocated to the transmitter units TU1 and TU2 are identical and overlap completely, so that Mi=M1=M2.

This is the case for example in the context of MU-MIMO communication, in which the receiver unit includes multiple receive antennas that allow it to separate the signals from different transmitter unit TU1, TU2 and to estimate the response of the communication channel CH1, CH2 of each of them.

For example, we consider that the receiver unit RU has allocated the same 4 resource blocks RB to the transmitter units TU1 and TU2.

The Zadoff-Chu sequence of the customer unit TU1 is therefore of length $M_1/2=24$, the largest prime number less than 24 is $N_{ZC}=23$ and the elements of the sequence are expressed, as in the previous case, as follows:

$$ZC^{TU1}(l) = e^{\frac{j\pi q_1 l(l+1)}{N_{ZC}}} = e^{\frac{j\pi l(l+1)}{23}} \text{ for } n \text{ ranging between 1 and 23} \quad (11)$$

$$ZC^{TU1}(24) = ZC^{TU1}(1) \quad (12)$$

As for the Zadoff-Chu sequence of the customer unit TU2, it is expressed as follows:

$$ZC^{TU2}(l)=ZC^{TU1}(l)\cdot e^{j\pi(l-1)} \text{ for } l \text{ ranging between 1 and 24} \quad (14)$$

$FR=e^{j\pi(l-1)}$ is a phase rotation factor that will allow the receiver unit to estimate the two communication channels CH1, CH2 from the signal SR received on the same frequency band.

In this example, let us assume that the communications between transmitter units TU1, TU2 and the receiver unit RU are synchronous.

On the receiver side, the estimation step R'2 implements the following sub-steps:

- estimation R'21 of the components $\hat{H}_{2n+1}$ of the communication channel, with n ranging between 1 and (Mi−1)/2, from the complex values extracted from the odd carriers, similar to R21. For example, they are obtained by multiplying the complex value extracted from a carrier mi (odd) by the corresponding conjugate of the complex value of the sequence SC1 specific to the transmitter unit TU1. Alternatively, one could use the sequence SC2 specific to transmitter unit TU2. We understand that here we estimated a combination of the frequency responses of the two communication channels CH1, CH2 followed respectively by the signals ST1, ST2 transmitted by the customer units TU1, TU2;
- interpolation R'22 for the components $\hat{H}_{2n}$ of the communication channel on the even-numbered carriers, similar to R22, for example by convolution using a predefined filter $F^{TU1}$ or $F^{TU2}$;
- application R'23 of an Inverse Fast Fourier Transform I-FFT to the components of frequency response of the channel $\hat{H}_m$, with m between 1 and Mi obtained, so as to separate temporally the components of the communication channel CH1 from those of the communication channel CH2. This separation is made possible by the phase rotation factor FR previously described, whose frequency multiplication is converted, due to the inverse transformation, into a time shift. At the end of this last step R'23, we obtain the impulse responses $\tilde{h}^{TU1}$, $\tilde{h}^{TU2}$ of each communication channel CH1, CH2.

Figure 10:
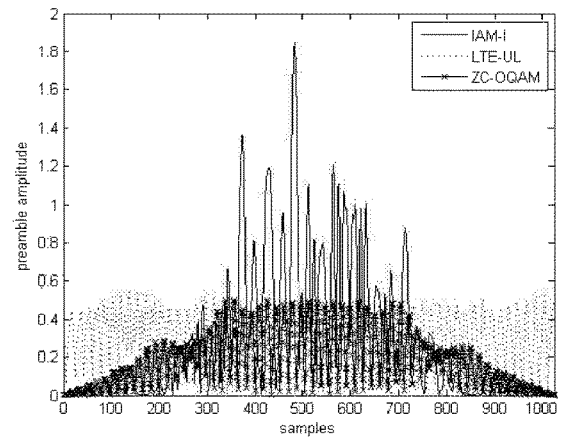

In connection with FIGS. 10, 11 and 12, we present a comparison of results obtained by the channel estimation according to the invention (designated ZC-OQAM) with those of the techniques of the prior art, for two transmitter units transmitting over separate frequency bands, in an asynchronous environment. The prior art techniques used as reference are in particular a conventional OFDM modulation associated with an LS (Least Square)-type channel estimate as specified in the standard LTE (designated as LTE-UL) and of an OFDM-OQAM modulation associated with a channel estimation IAM-I (designated as OQAM IAM-I).

FIG. 10 relates the PAPR generated by each technique. We see that the receiving technical of the invention generates a preamble amplitude, so a much lower level of PAPR than the prior art OQAM IAM-I.

FIG. 11 shows the average error MSE (for "Mean Square Error") of the channel estimate obtained with these three techniques in a particular situation where a first transmitter unit TU1 is first the only one to transmit, followed by a second 2 transmitter unit TU2 that transmits at the same time. We see that as a single unit transmits the three techniques achieve similar results, but only from the time when both units TU1, TU2 transmit at the same time, the conventional OFDM technique fails to estimate both canals correctly. Conversely, the technique of the invention produces a level of MSE for the channel estimate which remains satisfactory, even after the arrival of data from the second user unit.

FIGS. 12a and 12b concern measurements of SER (for "Symbol Error Rate") obtained at the reception, depending on the SNR (for "Signal to Noise Ratio"). We see in FIG. 12a that the reception technique according to the invention achieves comparable performance to the techniques of the prior art for the first receiver unit. FIG. 12b relates to the reception of the signal from the second transmitter unit. It shows that the classic LS OFDM technology cannot do it properly, while the technique according to the invention achieves results comparable to those of OQAM-IAMI.

In connection with FIGS. 13a and 13b compares the channel estimation performance, in terms of MSE obtained by the three previous techniques, in the case where both transmitting devices transmitting at the same frequency band in a synchronous communication context. The technique of the invention (ZC-OQAM) obtains results similar to the conventional OFDM technology (LTE-UL) for the first and second customer units, while the OQAM-IAM-I technology is unable to estimate the channel for the second transmitter unit.

An exemplary embodiment of the present application overcomes the shortcomings of prior art.

An exemplary embodiment proposes a solution which allows a transmitter unit to estimate the transmission channel from a multi-carrier signal received, whereas the signal has been transmitted by a transmitter unit subjected to energy consumption constraints, in a massively multi-user environment.

An exemplary embodiment proposes a channel estimation solution which is also adapted to an asynchronous communication mode.

It goes without saying that the embodiments which have been described above have been given purely by an indicative and non-limiting way, and that many modifications can be easily made by those skilled in the art without departing from the scope of the invention.

The invention claimed is:

1. A method for transmitting a multi-carrier signal implementing an Offset Quadrature Amplitude Modulation (OQAM)-type modulation intended for transmission via a channel transmission system, formed by a temporal succession of symbols comprising a set of data elements comprising:
real-value informative elements of data, and
for at least some of said symbols, elements of reference data, so-called pilots, known by at least one receiver designed for receiving the multi-carrier signal,
as each of said data elements modulates a carrier frequency of said signal, a carrier frequency modulated by one of said data elements being called a carrier,
a set of carriers being allocated to a transmitter unit,
wherein said transmission method comprises inserting a sequence of pilots specific to said transmitter unit at a given time (TS) into the multi-carrier signal on said allocated set of carriers, said sequence of pilots comprising:
a sequence of non-zero complex values, inserted on odd or even carriers, alternating with zero values, inserted on the other carriers, respectively even or odd-numbered,
non-zero complex values of the sequence of pilots, their frequency transforms and inverse frequency transforms being with a constant envelope, and
a sequence of zero values modulating the carriers of the set of carriers allocated at a following time (TS+$\tau 0$); and
transmitting the multi-carrier signal by the transmitter unit.

2. The transmission method of a multi-carrier signal according to claim 1, wherein the sequence of non-zero complex values of the sequence of pilots is a Constant Amplitude Zero Auto-Correlation (CAZAC)-type sequence of length (L) equal to half the number of carriers allocated to the transmitter unit.

3. The transmission method of a multi-carrier signal according to claim 2, wherein the sequence of non-zero complex values of the sequence of pilots is a Zadoff-Chu-type sequence, defined by the following expression:

$$ZC(l) = e^{\frac{j\pi q l(l+1)}{N_{ZC}}}$$

with I, an index of the complex value in the sequence, q an integer corresponding to a root sequence specific to the customer unit and $N_{zc}$ is equal to the largest prime number smaller than the length (L) of the sequence.

4. The transmission method of a multi-carrier signal according to claim 2, wherein the sequence of non-zero complex values of the sequence of pilots is a Björck-type sequence, defined by the following expression:

$$BS(u) = \frac{1}{\sqrt{L}} \cdot a, \text{ with } a = \begin{cases} 1 \text{ for } l = 0 \\ e^{j(\cos(1/1+\sqrt{L})) \text{for } u=l^2 \bmod L \text{ and } l=1, \ldots, L-1} \\ e^{-j(\cos(1/1+\sqrt{L})) \text{otherwise}} \end{cases}$$

and L the length of the sequence.

5. The transmission method of a multi-carrier signal according to claim 1, wherein the non-zero complex values of the sequence of pilots are multiplied by a phase rotation factor.

6. The transmission method of a multi-carrier signal according to claim 1, wherein the sequence of pilots is inserted into the multi-carrier signal at a non-zero time TS and further comprises a sequence of zero-values modulating the carriers of the set of carriers allocated to a preceding time (TS-$\tau 0$).

7. The transmission method of a multi-carrier signal according to claim 1, wherein the sequence of pilots is inserted into the multi-carrier signal at a non-zero time TS, the informative data elements inserted at a preceding time (TS-$\tau 0$) modulating the carriers of the set of allocated carriers according to a cyclic-OQAM type modulation.

8. A device for transmitting a multicarrier signal implementing an Offset Quadrature Amplitude Modulation (OQAM)-type modulation intended for transmission via a channel transmission system, formed by a temporal succession of symbols comprising a set of data elements comprising:
real-value informative elements of data, and
for at least some of said symbols, elements of reference data, so-called pilots, known by at least one receiver designed for receiving the multi-carrier signal,
as each of said data elements modulates a carrier frequency of said signal, a carrier frequency modulated by one of said data elements being called a carrier,
wherein the device comprises:
a transmitter unit, wherein a set of carriers is allocated to the transmitter unit, and
an insertion unit, which inserts a sequence of pilots specific to said transmitter unit at a given time (TS) into the multi-carrier signal on said allocated set of carriers, said sequence of pilots comprising:
a sequence of non-zero complex values, inserted on odd or even carriers, alternating with zero values, inserted on the other carriers, respectively even or odd-numbered,
non-zero complex values of the sequence of pilots, their frequency transforms and inverse frequency transforms being with a constant envelope, and a sequence of zero values modulating the carriers of the set of carriers allocated at the following time (TS+τ0).

9. A method for receiving a signal corresponding to at least one multi-carrier signal implementing an Offset Quadrature Amplitude Modulation (OQAM)-type modulation, transmitted by at least one transmitter unit via a transmission channel, said signal being formed of a temporal succession of symbols comprising a set of data elements comprising:

real-value informative elements of data, and for at least some of said symbols, elements of reference data, so-called pilots, known by at least one receiver designed for receiving the multi-carrier signal, as each of said data elements modulates a carrier frequency of said signal, a carrier frequency modulated by one of said data elements being called a carrier, a set of carriers being allocated to a transmitter unit, wherein, a sequence of pilots specific to said transmitter unit having been. inserted into the multi-carrier signal on said allocated set of carriers, said sequence of pilots comprising:

a sequence of non-zero complex values, inserted on odd or even carriers, alternating with zero values, inserted on the other carriers, respectively even or odd-numbered, at a given time (TS), non-zero complex values of the sequence of pilots, their frequency transforms and inverse frequency transforms being with a constant envelope, and a sequence of zero values modulating the carriers of the set of carriers allocated at the following time (TS+τ0), wherein the receiving method comprises the following acts performed by a receiving device:

receiving the multi-carrier signal from the transmission channel;

extracting complex values corresponding to non-zero values of the sequence of pilots on the odd or even carriers, after passing through the transmission channel, estimating a frequency response of said transmission channel on the odd or even carriers from the complex values extracted, and estimating a frequency response of said transmission channel on the other carriers, respectively even or odd by frequency interpolation of the channel response, estimated on the even or odd carriers.

10. The method for receiving a signal received corresponding to at least one a multi-carrier signal implementing an OQAM-type modulation according to claim 9, wherein the set of carriers having been allocated to at least one second transmitter unit, said method further comprises implementing an inverse time-frequency transform for separating, on the carriers of the allocated set of carriers, the components from a first multi-carrier signal transmitted by the first transmitter unit from those originating from at least one second multi-carrier signal transmitted by at least one second customer unit.

11. A device for receiving a signal corresponding to at least one multi-carrier signal implementing an Offset Quadrature Amplitude Modulation (OQAM)-type modulation, transmitted by at least one transmitter unit via a transmission channel, said signal being formed of a temporal succession of symbols comprising a set of data elements comprising:

real-value informative elements of data, and for at least some of said symbols, elements of reference data, so-called pilots, known by at least one receiver designed for receiving the multi-carrier signal, as each of said data elements modulates a carrier frequency of said signal, a carrier frequency modulated by one of said data elements being called a carrier, a set of carriers being allocated to said transmitter unit, wherein, a sequence of pilots specific to said transmitter unit having been inserted at a given time into the multi-carrier signal on said allocated set of carriers, said sequence of pilots comprising:

a sequence of non-zero complex values, inserted on odd or even carriers, alternating with zero values, inserted on the other carriers, non-zero complex values of the sequence of pilots, their frequency transforms and inverse frequency transforms being with a constant envelope, and a sequence of zero values modulating the carriers of the set of carriers allocated at a following time (TS+τ0), wherein said receiving device comprises the following units:

a unit which extracts complex values corresponding to non-zero values of the sequence of pilots on the odd or even carriers, after passing through the transmission channel, a unit which estimates a frequency response of said transmission channel on the odd or even carriers from the complex values extracted, and a unit which estimates a frequency response of said transmission channel on the other carriers, respectively even or odd by frequency interpolation of the channel response, estimated on the even or odd carriers.

12. A non-transitory computer-readable medium comprising program code instructions stored thereon for implementing a method of transmitting a multi-carrier signal when the instructions are executed by a processor of a transmission device, the multi-carrier signal implementing an Offset Quadrature Amplitude Modulation (OQAM)-type modulation intended for transmission via a channel transmission system, formed by a temporal succession of symbols comprising a set of data elements comprising:

real-value informative elements of data, and for at least some of said symbols, elements of reference data, so-called pilots, known by at least one receiver designed for receiving the multi-carrier signal, as each of said data elements modulates a carrier frequency of said signal, a carrier frequency modulated by one of said data elements being called a carrier, a set of carriers being allocated to a transmitter unit, wherein said instructions configure the transmission device to perform acts comprising:

inserting a sequence of pilots specific to said transmitter unit at a given time (TS) into the multi-carrier signal on said allocated set of carriers, said sequence of pilots comprising:

a sequence of non-zero complex values, inserted on odd or even carriers, alternating with zero values, inserted on the other carriers, respectively even or odd numbered, non-zero complex values of the sequence of pilots, their frequency transforms and inverse frequency transforms being with a constant envelope, and a sequence of zero values modulating the carriers of the set of carriers allocated at a following time (TS+τ0); and transmitting the multi-carrier signal to the channel transmission system.

13. A non-transitory computer-readable medium comprising program code instructions stored thereon for implementing a method of receiving a signal when the instructions are executed by a processor of a receiving device, the signal corresponding to at least one multi-carrier signal implementing an Offset Quadrature Amplitude Modulation (OQAM)-type modulation, transmitted by at least one transmitter unit via a transmission channel, said signal being formed of a temporal succession of symbols comprising a set of data elements comprising:

real-value informative elements of data, and for at least some of said symbols, elements of reference data, so-called pilots, known by at least one receiver designed for receiving the multi-carrier signal, as each of said data elements modulates a carrier frequency of said signal, a carrier frequency modulated by one of said data elements being called a carrier, a set of carriers being allocated to a transmitter unit, wherein, a sequence of pilots specific to said transmitter unit having been inserted into the multi-carrier signal on said allocated set of carriers, said sequence of pilots comprising:

a sequence of non-zero complex values, inserted on odd or even carriers, alternating with zero values, inserted on the other carriers, respectively even or odd-numbered, at a given time (TS), non-zero complex values of the sequence of pilots, their frequency transforms and inverse frequency transforms being with a constant envelope, and a sequence of zero values modulating the carriers of the set of carriers allocated at a following time (TS+τ0), wherein the instructions configure the receiving device to perform acts comprising:

receiving the multi-carrier signal from the transmission channel;

extracting complex values corresponding to non-zero values of the sequence of pilots on the odd or even carriers, after passing through the transmission channel, estimating a frequency response of said transmission channel on the odd or even carriers from the complex values extracted, estimating a frequency response of said transmission channel on the other carriers, respectively even or odd by frequency interpolation of the channel response, estimated on the even or odd carriers.

* * * * *